C. W. McFARLAND & G. N. GRIFFIN.
AUTOMATIC NUT CRACKING MACHINE.
APPLICATION FILED SEPT. 19, 1917.
1,265,350.
Patented May 7, 1918.
3 SHEETS—SHEET 2.
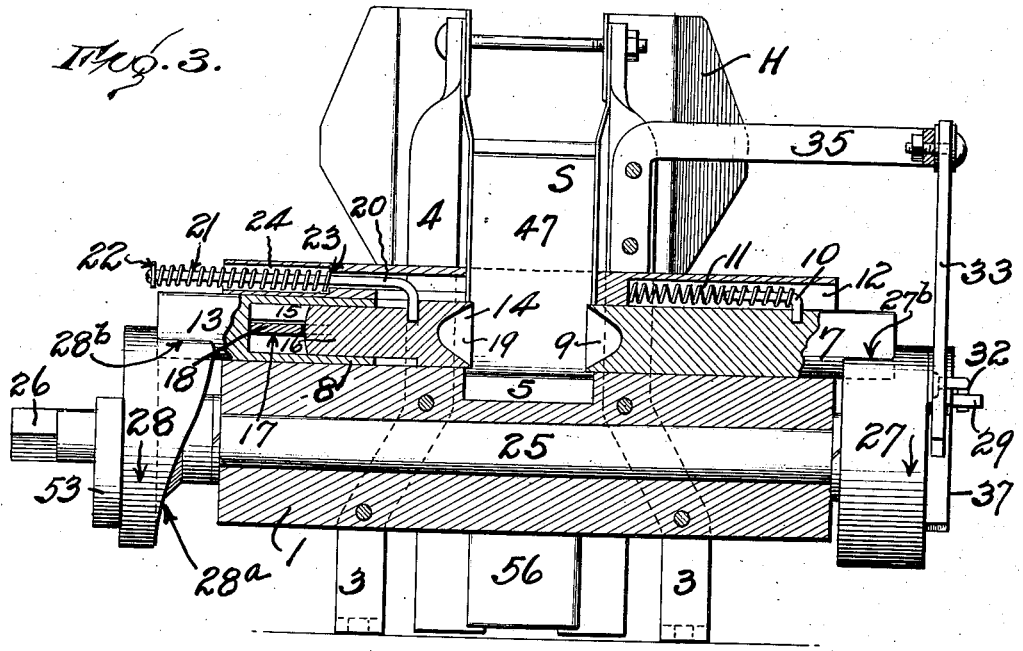
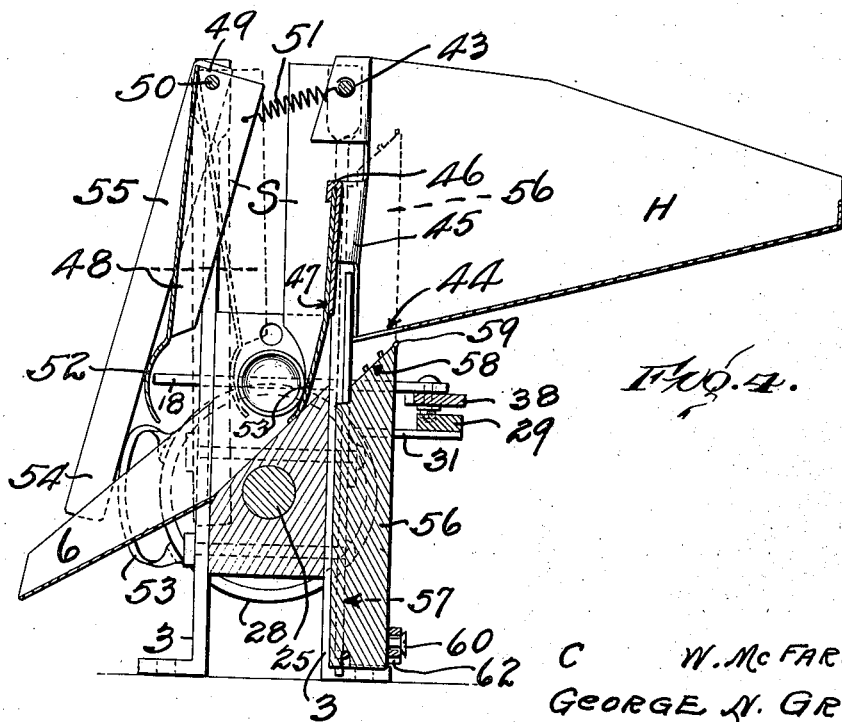
Inventors
W. McFARLAND
GEORGE N. GRIFFIN
By
Attorney

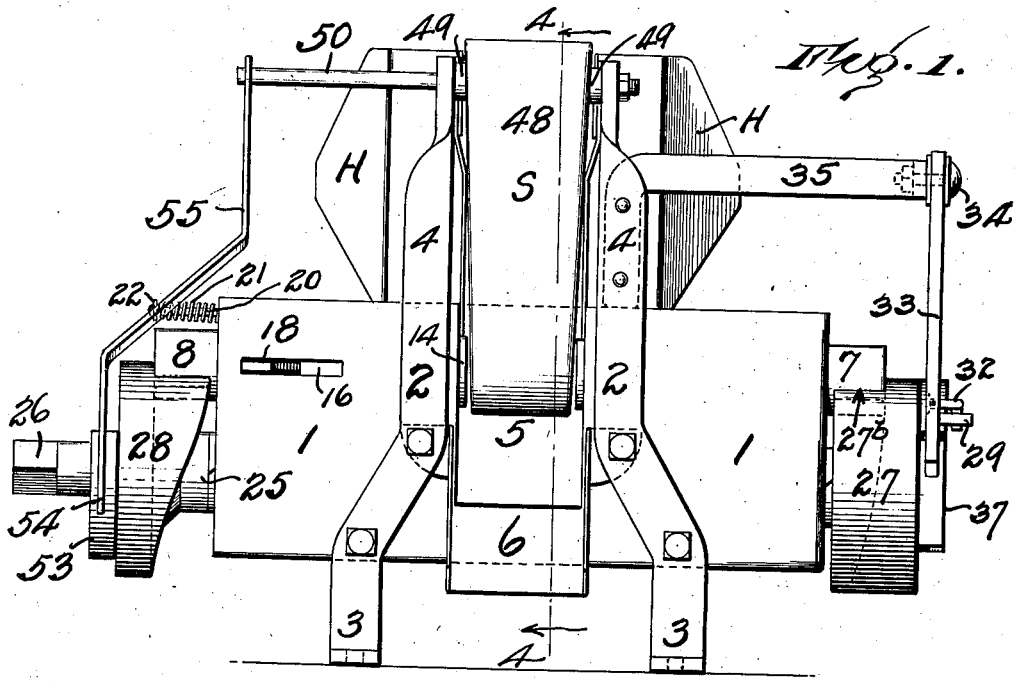
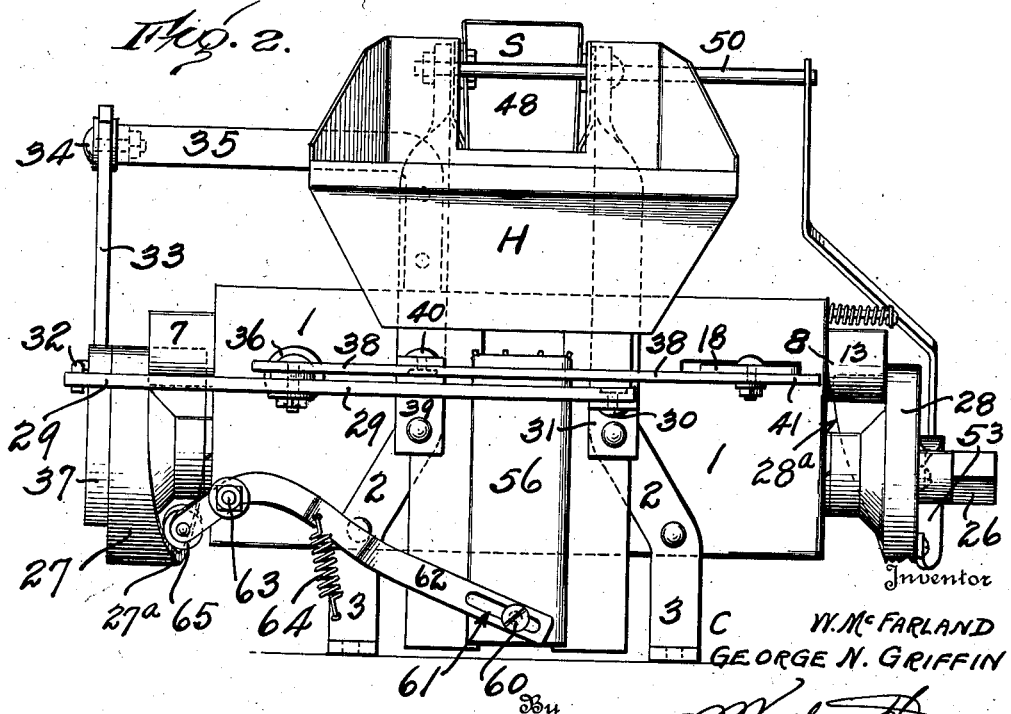

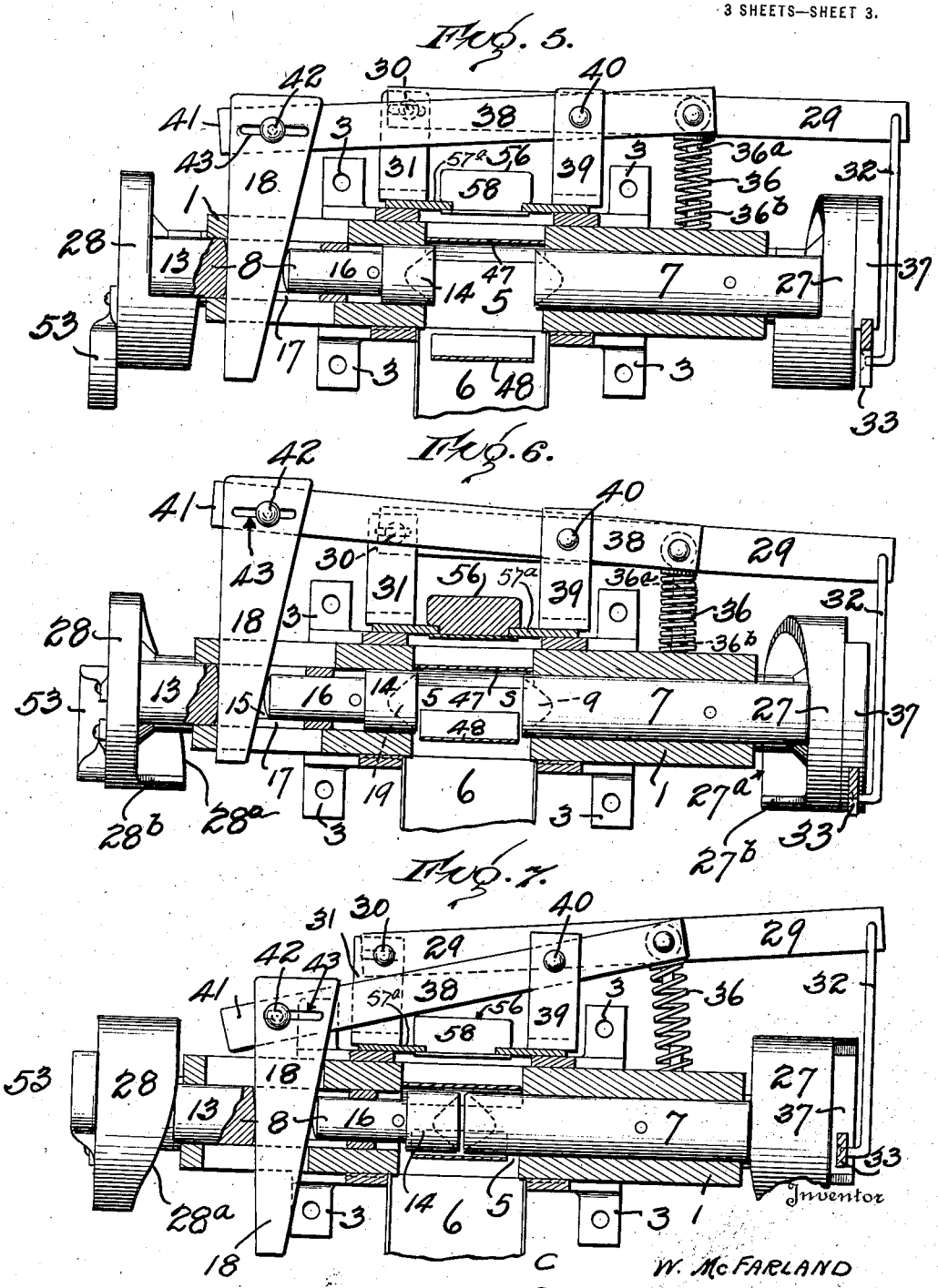

UNITED STATES PATENT OFFICE.

CHARLEY W. McFARLAND AND GEORGE N. GRIFFIN, OF SHAWNEE, OKLAHOMA, ASSIGNORS OF ONE-THIRD TO CHARLES E. WELLS, OF SHAWNEE, OKLAHOMA.

AUTOMATIC NUT-CRACKING MACHINE.

1,265,350.                    Specification of Letters Patent.     Patented May 7, 1918.

Application filed September 19, 1917. Serial No. 192,146.

*To all whom it may concern:*

Be it known that we, CHARLEY W. MC-FARLAND and GEORGE N. GRIFFIN, citizens of the United States, residing at Shawnee, in the county of Pottawatomie and State of Oklahoma, have invented certain new and useful Improvements in Automatic Nut-Cracking Machines, of which the following is a specification.
This invention relates to nut-cracking machines, and has particular reference to an improvement in machines of the automatic type, possessing special utility for cracking pecan nuts.
To this end the invention contemplates providing novel means for rapidly cracking the shells of the nuts without damaging the nut meats, whereby preserving their integrity and rendering the same of greater market value. In this connection, it is proposed to provide a cracking mechanism including yieldingly mounted cracking elements, one of which is of novel construction whereby it may be readily and quickly adjusted automatically to compensate for the varying sizes and lengths of the pecans, thereby insuring a uniform cracking of all nuts passing through the machines.

Another object is to provide a novel feeding device for presenting the pecans in single order to the cracking instrumentalities thereby preventing over-feeding and insuring a reliable action in placing one nut at a time into position for cracking, and then permitting the discharge of the cracked nut by the opening up of a part of the feed means which also serves to hold the nut in cracking position.

A further object of the invention is to provide a novel construction and arrangement of parts which are relatively simple, and accurate and reliable in operation, and are furthermore readily accessible for making adjustments and repairs.
With the above and other objects in view which will more readily appear as the nature of the invention is better understood, the same consists in a novel construction, combination, and arrangement of parts, hereinafter more fully described, illustrated and claimed.

A preferred and practical embodiment of the invention is shown in the accompanying drawings, in which:—

Figure 1 is a front elevation of the improved nut-cracking machine.

Fig. 2 is a rear elevation thereof.

Fig. 3 is a vertical longitudinal sectional view.

Fig. 4 is a vertical cross-sectional view on the line 4—4 of Fig. 1 looking in the direction of the arrows.

Fig. 5 is a more or less diagrammatic horizontal cross-sectional view illustrating the normal condition of the various operating instrumentalities of the machine when the main operating shaft is in its normal position.

Figs. 6 and 7 are views similar to Fig. 5 showing the relation of the parts respectively when the automatic adjusting device is caused to be set during the initial forward movement of the nut-cracking plungers and when the said automatic adjusting device has been tripped.

Similar references designate corresponding parts throughout the several figures of the drawings.

In carrying the present invention into effect, it is proposed to provide a nut-cracking machine embodying in its organization a plurality of coöperating devices which are accurately synchronized to perform their respective functions at the proper intervals and in the desired order, whereby the expeditious and successful cracking of the pecans or other nuts may be carried on without interruptions or manual interference.

Accordingly, the present embodiment of the invention essentially includes a nut-cracking device consisting of oppositely working plungers, an automatic adjusting device for one of the plungers, a nut-feeding device for supplying the nuts in single order to the cracking zone between the plungers, and a prime operating element having means associated therewith for operating the various devices referred to.

Referring now more particularly to the details of construction of the present machine it may be observed from Fig. 1 of the drawings that the devices above referred to are assembled and supported on a substantially rectangular body block 1 provided at its intermediate portion with a plurality of standards 2—2 whose lower ends 3 are formed with suitable attaching feet for securing the device to a table or other convenient support, while the upper ends 4 thereof extend upwardly above the block to support various other parts of the apparatus, as will presently appear. The central portion of the said body block 1 is cut away as shown in the drawings to provide a nut-cracking chamber 5, and as will be observed from Figs. 1 and 4 the lower end of this chamber is fitted with an inclined delivery chute 6 for conveying the nuts from the cracking chamber into a suitable collecting receptacle.

Mounted in the upper portion of the block, is the nut-cracking device, which, as previously indicated includes a pair of oppositely working spring-retracted plungers 7 and 8 whose inner ends operate within the cracking chamber 5 to break or split the shells of the nuts in a manner to be presently described. The first mentioned plunger 7 is slidably mounted in the upper part of the block 1 as will be clearly seen from Fig. 3, and as shown consists of an integral body having a nut-receiving cavity 9 at its crushing end, while its intermediate portion is fitted with a suitable angular abutment 10 which coöperates with a spring 11 housed within a spring socket 12 in the block 1 above the plunger, to maintain the said plunger 7 in its normal retracted position, the latter being that shown in Fig. 3 of the drawings.

The opposite plunger 8 which constitutes the other portion of the nut-cracking device is of special formation, whereby the same may be automatically adjusted to different lengths to compensate for the varying sizes of the nuts to be cracked. That is to say this plunger is relatively extensible and contractible according to the conditions imposed upon the machine, and preferably consisting of a body 13 having an adjustable crushing head 14 whereby the position thereof may be altered with respect to the body. By reference to Figs. 3, 5, 6, and 7 of the drawings it will be observed that the body of the plunger 13 is formed with the socket 15 for telescopically receiving the shank portion 16 of the crushing head 14. Furthermore, the body 13 of the plunger is provided with an elongated transverse slot 17 which is in open communication with the socket 15, and is adapted to receive a tapered thrust bar 18 which constitutes a variable coupling for the crushing head and body of the plunger 8, as will hereinafter more fully appear. The said crushing head 14, like the head portion of the plunger 7, is provided with a nut-receiving cavity 19, and for the purpose of maintaining the entire plunger assembly 8 in its normal retracted position, the said head 14 has fitted thereto an angular spring supporting arm 20 which extends rearwardly in the direction of the body 13 of the plunger and has fitted thereto a suitable coil spring 21 which is confined between an abutment washer 22 on the end of the arm and the shoulder 23 of a spring bore 24 formed in the block 1.

From the foregoing it will be apparent that the nut-cracking device essentially consists of a solid plunger 7 which performs more or less the function of an anvil in the cracking operation, and a two-part adjustable plunger 8 which automatically compensates for the different lengths of the nuts being cracked to insure the proper cracking of the shells thereof. In this connection it will be obvious that the tapered thrust bar 18 referred to constitutes a variable coupling between the crushing head and body of the plunger 8, whereby the head will be maintained in an extended position, or its normal contracted position, according to the condition of the machine. This tapered thrust bar 18 constitutes a part of the automatic adjustable device previously mentioned, which like the nut-cracking device, consisting of the plungers 7 and 8, is operated by the prime operating element.

With reference to the prime operating element, it may be noted that the same essentially consists of a main operating shaft 25 journaled longitudinally in the block 1 and having one end thereof formed as at 26 to receive a hand crank, pulley or equivalent device for effecting its operation. This shaft carries therewith at opposite ends of the body 1 a pair of separate operating cams 27 and 28, which are more or less in the nature of a wheel having a mutilated rim which in each instance produces the desired camming edge. The cam 27 which operates the plunger 7 is provided with a helicoidal cam edge $27^a$ of substantially uniform pitch which terminates abruptly at $27^b$, whereby the forward movement of the plunger 7 of the nut-cracking device may be uniform throughout the cam cycle. However the cam 28 which operates the plunger 8 is formed with a cam edge $28^a$ which is of variable pitch, as will be observed from Figs. 3 and 5 to 7 inclusive and terminates abruptly at $28^b$ like the cam wheel 27, so that in the normal condition of the apparatus the edges $27^b$ and $28^b$ of the cams 27 and 28 respectively, are in abutting contact with the sides of the plungers 7 and 8. The purpose of making the cam edge $28^a$ of non-uniform pitch, is to permit the automatic adjusting device to come into play to push the crushing head 14 of the plunger 8 forwardly to engage the nut, and then push the entire plunger assembly 8, whose parts 13 and 14 have been locked together by the variable coupling 18, forwardly to crush the nut.

The automatic adjusting device which includes the tapered or wedge like thrust bar 18, consists of a compressor bar 29 loosely pivoted as at 30 to a bracket 31 carried by the rear of the rectangular body block 1, while the opposite end thereof is connected by means of a link 32 with a lever arm 33 pivotally supported as at 34 on a bracket 35 secured to the upper end 4 of one of the standards 2. As will be observed from Figs. 5 to 7 inclusive a relatively stout compression spring 36 is confined between the compressor bar 29 and the rectangular body block 1, and held in position by suitable studs $36^a$ and $36^b$ respectively carried by the bar and the block, thus tending to place the bar under strong spring tension in a direction away from the body block 1. The said lever arm 33 which is connected with the bar 29 by link 32 is adapted to be oscillated by a cam element 37 projecting from and carried by the outer face of the cam wheel 27. This cam element 37 represents only a portion, namely 180° of the circumference of the cam wheel, and is so positioned thereon that for half of the cycle of rotation of the cam wheel 27 the lever arm 33 is drawn forward to compress the spring 36. Then, when the cam 27 has made 180° of this cycle the arm 33 is abruptly released, thus releasing the compressor bar 29, whereby the relatively stout coil spring 37 which has been compressed during the forward movement of the bar 29 will snap the end of the latter which is connected with the link 32 rearwardly with a quick sharp movement.

The intermediate portion of the compressor bar 29 has pivotally connected thereto at a point adjacent the engagement of the spring 36 therewith, one end of a trip lever 38. This trip lever is pivotally supported on a bracket 39 by relatively fixed pivot pin 40, and as will be observed from the figures referred to this pivot 40 is positioned relatively close to the point at which the said trip lever is pivotally connected with the bar 29, whereby the free end 41 of the trip lever will have a greater degree of angular movement than the end thereof which is connected with the compressor bar. The free end of the compressor bar 41 carries a fixed stud 42 adapted to work in the transverse slot 43 of the tapered thrust bar 18, thereby providing a relatively loose and adjustable connection between the thrust bar and trip lever to adequately compensate for the relative movement of the two parts.

With the arrangement described it will be observed that when the shaft 25 which carries the cams 27 and 28 starts its cycle the plunger 7 will be uniformly advanced inwardly a relatively small distance while the plunger 8 remains substantially idle, then as the cycle continues the plunger 8 moves inward slightly, and in the meantime the automatic adjusting device has been set by the cam element 37. That is to say, as soon as the shaft 25 starts its operating cycle the cam 37 engages the arm 33, thereby pulling the compressor bar 29 forward under the tension of the spring 37, while at the same time withdrawing the thrust bar 18 from the slot 17 so that the narrowest portion thereof is placed between the plunger body 13 and the crushing head 14, as shown in Fig. 6, whereby when the shaft 25 completes the first 180° of its cycle the arm 33 will be abruptly released to permit the compressor bar 29 to snap rearwardly and thus force the thrust bar 18 quickly between the parts 13 and 14 of the plunger 8 to quickly drive the said crushing head 14 forward to cause it to positively and yieldingly engage one end of the nut and firmly hold the latter against the crushing head of the opposite plunger 7. The continued rotation of the shaft 25 for the balance of its cycle causes the crushing head portion of the two plungers to come closely together, since the zeniths of the cam edges $27^a$ and $27^b$ are brought into play. After the highest portions or zeniths of the cams have pushed the plungers inward to their limit against the tension of the springs 11 and 21, the transverse edges $27^b$ and $28^b$ of the cams register with the ends of the plungers and the latter snap back to their normal tension thus releasing the cracked nut. The thrust bar 18 remains in its inward position all during the return movement of the plunger to its normal position, and also during the "at rest" normal position of the apparatus, and is only withdrawn at the beginning of each cycle of operation of the shaft 25. This initial movement of the shaft will, in the machine shown, permit the crushing head 14 to recede slightly during the initial part of the cycle as will be seen by comparison of Figs. 5 and 6.

The feeding of nuts to the crushing instrumentalities of the nut-cracking device is accomplished through the medium of the nut feeding device which includes in its organization a suitable feed hopper H carried by the rear standards 2—2 of the machine as indicated at 43 and having a clearance opening 44 in its bottom wall and a relatively short vertical wall 45 which terminates in a hook 46 for engaging over the relatively fixed guide wall 47 of a nut-feeding chute designated generally as S and forming a part of the feeding device. This nut-feeding chute which includes the inclined wall 47 also includes a swinging chute member 48 which is hingedly supported as at 49 on a rock shaft 50 journaled in the upper ends 4 of the front standards 2 of the machine, and held in its normal closed position by means of a spring 51. The lower portion of the chute member 48 is formed with a curved nut embracing jaw 52 which coöperates with the substantially similar portion 53 of the wall 47 to provide for positioning a nut directly between the ends of the plungers 7 and 8. When the chute member 48 is in its closed position as shown in dotted lines in Fig. 4, it coöperates with the chute member having the wall 47 to provide a relatively closed nut guide way which tapers downwardly to produce a relatively restricted outlet adjacent the jaws 52 and 53, to insure the feeding of the nuts to the cracking plungers in single order. After the nuts have been cracked by the said plungers, the chute member 48 is swung downwardly to the full line position in Fig. 4 against the tension of the spring 51 to release the cracked nut and to permit the same to fall down the delivery chute 6. This releasing movement of the hinged chute member 48 is caused by a cam 53 carried by the cam wheel 28 engaging the free end 54 of an angular lever arm 55 carried by the rock shaft 50 on which the said chute member 48 is mounted. The cam 53 for operating the arm 55 is of course so located on the cam wheel 28 as to cause the chute member 48 to be swung outwardly when the plungers 7 and 8 are in their full retracted positions.

In addition to the instrumentalities previously referred to the said nut-feeding device comprises an automatic nut elevator for removing nuts from the hopper into the chute S. As will be seen from the drawings, particularly Figs. 2 and 4, this nut elevator is preferably in the form of a vertically movable block 56 formed with opposite guide channels 57 for engaging the edge portions of suitable guide plates 57ª carried by the rear face of the rectangular body block 1, whereby the same may be guided in its vertical movement through the clearance opening 44 in the bottom of the hopper to lift a nut over the hook portion 46 of the hopper. The upper end of the nut elevator 56 is preferably inclined as at 58 and provided with a plurality of up-standing burs or fins 59 which assist in positioning the nut on the end thereof as the elevator travels through the collection of nuts in the hopper.

For the purpose of providing the necessary vertical reciprocating movement of the nut elevator 56 the lower end thereof carries a fixed stud 60 adapted to ride in a slot 61 formed in the free end of an operating lever 62 pivotally supported as at 63 on the rectangular body block 1 of the machine and held in its normal position by a suitable coil spring 64. The end of the lever 62 opposite its connection with the nut elevator 56 carries therewith a roller 65 for engaging with the cam edge 27ª of the cam wheel 27 in such a manner that as the said wheel 27 makes the first half of its cycle the roller end of the lever 62 will be pressed downwardly to thereby lift or raise the nut elevator 56 and cause the nut to be displaced from the hopper into the chute.

From the foregoing it will be apparent that the present invention provides a novel assembly of operating units which coöperate at the proper intervals to perform the various functions of feeding, adjusting and cracking. And, briefly reviewing the general operation of the device it may be noted that when the machine is in its normal position, that is when the plungers are retracted, the nut elevator 56 is at the downward limit of its movement and the hinged member 48 of the chute S is held in an outward position as shown in full lines in Fig. 4. Also the automatic adjusting device is in the position shown in Fig. 5 whereby the thrust bar is at the limit of its inward movement. When the shaft 25 starts its cycle, the thrust bar 18 is immediately withdrawn, the plungers remain relatively idle for a fractional period of time while the nut elevator moves upward to displace a nut from the hopper into the chute and the cam 53 releases the arm 55 to permit the spring 51 to draw the hinged member 48 inwardly. When the nut elevator 56 has reached the limit of its upward movement, the plunger 7 begins to advance inwardly, and the continued movement of the shaft 25 to a point substantially through a 180° of its cycle, causes the release of the compressor bar 29 to thus snap the thrust bar 18 inwardly and push the crushing head 14 forward. Then both plungers are pushed to the limit of their inward movement by the cam edges 27ª and 27ᵇ of the cam wheels 27 and 28 respectively, and when the zeniths of the said camming edges have passed the plungers 7 and 8 the latter are pulled back to their retracted positions by means of the springs 11 and 21 as previously indicated.

We claim:

1. A nut-cracking machine including a body block, a main operating shaft journaled therein, cams at each end of said shaft, and a nut-cracking device including oppositely working plungers slidably arranged in the body block parallel to and above said shaft and also in the same vertical plane, said plungers being actuated by said cams.

2. A nut-cracking machine including a cracking device consisting of oppositely working plungers, one of which constitutes an anvil and the other of which includes a hollow body portion and a crushing head having a sliding telescopic engagement therewith, a spring actuated thrust bar constituting a variable coupling between the crushing head and the said body of the plunger, cam and lever means for tripping said thrust bar to cause the crushing head to quickly move toward the anvil plunger, and means for moving both plungers toward each other.

3. A nut-cracking machine including a cracking device consisting of oppositely disposed spring retracted plungers, one of said plungers having a socket at one end and a transverse slot, and a crushing head having a shank portion fitting within the socket, a tapering thrust bar adapted to work in said slot and engage with the end of the crushing head shank, a trip lever pivotally supported at its intermediate portion and having a loose connection at one end with said thrust bar, a compressor bar pivotally supported at one end and pivotally connected at its intermediate portion with the end of the trip lever opposite the thrust bar, a spring engaging with said compressor bar, a control lever connected with one end of the compressor bar, cams for engaging the plunger elements, and a cam carried by one of said first mentioned cams for engaging with said control lever.

4. A nut-cracking machine including a cracking device including oppositely working plungers, one of said plungers consisting of a body having a socket in one end and a transverse slot in communication with said socket, and a crushing head having a shank portion fitting within said socket, a tapering thrust bar operating in a horizontal plane and adapted to enter the said slot, a trip lever connected with one end of said thrust bar, a spring, a compressor bar for said spring and pivotally connected with one end of said trip lever, cam means for moving said plungers, and other cam means for abruptly releasing the compressor bar to cause a quick movement of the trip lever.

5. A nut-cracking machine including a cracking device consisting of oppositely working plungers, one of said plungers constituting an anvil, and having a spring for maintaining the same in normal retracted position, and the other of said plungers being automatically adjustable and including a plunger body having a socket, a transverse slot in communication with the socket, a crushing head having a shank fitting within said socket, a spring support carried by said crushing head and having a spring thereon for maintaining the entire plunger assembly in retracted position, a trip actuated thrust bar constituting a coupling between the shank of the crushing head and the plunger body, means for bodily moving said plungers toward each other, and other means for causing a quick actuation of the thrust bar.

6. A nut-cracking machine including a main operating shaft, a nut-cracking device consisting of oppositely working plungers, cam wheels carried by said main operating shaft and operatively engaging said plungers, a nut feeding device including a hopper having a clearance opening, a vertically slidable nut elevator working in said clearance, a spring tensioned lever connected at one end with said nut elevator, a roller carried by the other end of said lever for engaging one of the cam wheels on the main operating shaft.

7. A nut-cracking machine including a main operating shaft, a nut-cracking device consisting of oppositely working spring retracted plungers, one of said plungers constituting an anvil and the other being adjustable, cam wheels carried by said main operating shaft and engaging said plungers, a nut feeding device including a vertically reciprocating nut feeding element, a spring retracted lever having one end engaged with said nut feeding element and the other end operatively engaging with the cam wheel which moves the anvil plunger.

8. A nut-cracking machine including a main operating shaft, oppositely working plungers, cam wheels carried by said operating shaft for actuating said plungers, a nut-feeding device operated by one of said cams, a two-part nut feeding chute adapted to receive nuts from said feeding device to place them between the ends of said plungers, and cam lever means for actuating one part of said chute to release the cracked nut.

9. A nut-cracking machine including a main operating shaft, oppositely working plungers, cam wheels carried by said operating shaft for actuating said plungers, a nut feeding device operated by one of said cams, a nut feeding chute adapted to receive nuts from said feeding device to place them between the ends of said plungers, and consisting of a pair of separate substantially vertically disposed channeled sections one of which is pivotally supported, and cam and lever means for actuating the hinged section to release the cracked nut.

10. In a nut-cracking machine having a pair of oppositely working plungers, a nut feeding device including a feed hopper and a feed chute in communication therewith, said feed chute comprising a fixed jaw extending down into the space between the crushing ends of the plungers and a spring tensioned movable jaw coöperating therewith to provide a guide way for delivering and holding a nut in the path of movement of the opposed plungers, cam means for operating the plungers, and other cam means operated at the proper point in the cycle of said first mentioned cams to move the spring tensioned jaw to release the cracked nut.

11. In a nut-cracking machine having a pair of oppositely working plungers, a nut feeding device including a feed hopper and a feed chute in communication therewith, said feed chute comprising a fixed jaw extending down into the space between the crushing ends of the plungers and a spring tensioned movable jaw coöperating therewith to provide a guide way for delivering and holding a nut in the path of movement of the opposed plungers, an arm connected with said movable jaw, a main operating shaft, cams thereon for actuating the plungers and a cam carried by one of said other cams for engaging said arm to operate the movable jaw of the chute.

In testimony whereof we hereunto affix our signatures in the presence of two witnesses.

CHARLEY W. McFARLAND.
GEORGE N. GRIFFIN.

Witnesses:
W. T. WILLIAMS,
LOU ESTHER WALDREP.